United States Patent [19]
McClelland, III

[11] 3,733,493
[45] May 15, 1973

[54] SOLID STATE RADIOMETRIC PULSE INITIATOR FOR REMOTE METER READING SYSTEMS

[75] Inventor: Theodore M. McClelland, III, Cary, N.C.

[73] Assignee: Westinghouse Electric Corporation, Pittsburgh, Pa.

[22] Filed: Nov. 12, 1971

[21] Appl. No.: 198,319

[52] U.S. Cl............250/233, 250/219 DD, 250/209, 324/97
[51] Int. Cl................................G01d 5/36
[58] Field of Search..............250/225, 201 R, 231 P, 250/233, 219 DD, 209, 239; 324/96, 97, 15.7; 356/114

[56] References Cited

UNITED STATES PATENTS

| | | | |
|---|---|---|---|
| 3,290,593 | 12/1966 | Crowdes | 324/157 X |
| 3,399,347 | 8/1968 | Martens | 324/96 |
| 3,466,451 | 9/1969 | Hanchett, Jr. | 250/219 CR |
| 3,417,249 | 12/1968 | Akmenkalns et al. | 250/217 SS |
| 3,283,157 | 11/1966 | Blackmer | 250/239 X |
| 3,251,952 | 5/1966 | Shomer | 250/219 DD X |
| 3,499,158 | 3/1970 | Lavine et al. | 250/217 SS |

*Primary Examiner*—Walter Stolwein
*Attorney*—A. T. Stratton, Donald R. Lackey and R. Warren Smith

[57] ABSTRACT

A solid state radiometric pulse initiator for a remote meter reading system includes a sensing head having two combined source-pickup pairs mounted in a meter for initiating pulses in response to movement of a pattern disc. The source-pickup pairs control an output pulse generator to produce pulses over a three wire telemetering circuit. Each source-pickup pair includes a solid state radiation emitter and a cooperatively arranged radiation responsive solid state switch. The source-pickup pairs are connected to a source of alternating current so as to be alternately energized in an out-of-phase relationship to prevent false triggering due to cross-radiation between the pairs. A radiation filter is provided on a sensing head carrying the source-pickup pairs so as to concurrently increase the triggering sensitivity of the source-pickup pairs and permit operation with reduced current levels when the pulse initiator is operated under strong ambient light conditions typical in certain meter applications.

7 Claims, 6 Drawing Figures

SOLID STATE RADIOMETRIC PULSE INITIATOR FOR REMOTE METER READING SYSTEMS

FIELD OF THE INVENTION

This invention relates to pulse initiators for pulse operated remote meter reading systems and more particularly to a solid state radiometric pulse initiator including two source-pickup pairs having improved selectivity and sensitivity for detecting markings on a meter driven pattern disc.

BACKGROUND OF THE INVENTION

Electronic pulse initiators have been employed in remote meter reading systems and are well known for transmitting meter information of integrating type meters such as watthour meters into a representative quantity formed by a repetition of pulses. Remote meter reading telemetry systems of the type to which this invention pertains are described in Electrical Meterman's Handbook, Seventh Edition, published in 1965 by the Edison Electrical Institute, New York, N.Y. Photoelectric pulse initiators are described in the aforementioned publication and one type of a pulse initiator manufactured by the assignee of this invention includes a sensing head mounted within a watthour meter for carrying a pair of lamps which radiate indicia of a pattern disc movable by a shaft connected to the metering movement. The indicia couples the light of the lamps to photosensitive semiconductor switches also carried in the sensing head. Two sets of the indicia are oriented on the disc so that the photosensitive switches are rendered conductive alternately to actuate an output pulse generator for alternately signalling over two circuits of a three wire telemetering circuit. Since the pulse initiators are mounted in watthour meters intended for outdoor installations, they are subjected to sunlighted high ambient light conditions. Operation under these conditions has, in some instances, required adjustment of the sensitivity of the photosensitive semiconductor switches so that they are susceptible to false triggering due to the high levels of ambient light or lack of optical shielding. Elaborate shielding or use of light-proof housings greatly increases the cost of such pulse initiators and also makes use difficult due to the compact arrangements required for mounting within a meter housing.

SUMMARY OF THE INVENTION

In accordance with the present invention, a solid state radiometric pulse initiator for a remote meter reading system includes a sensing head having first and second source-pickup pairs with each pair being mounted so as to be periodically aligned respectively, with a separate indicia marking of a pattern disc rotated by a meter movement. Radiation emitted by a solid state source of each pair is separately coupled to a radiation responsive solid state switch, of the associated pair, by an associated marking. The radiation responsive switches are connected between an output generator and a power source of alternating current in an opposite parallel relationship for selectively conducting current in opposite directions to the output generator. The emitter sources are also connected in an opposite parallel relationship to the power source so as to conduct on opposite phases of the alternating current when the associated switch of each pair is rendered operative to conduct. During each complete cycle of the alternating current source, current in either direction is capable of being applied to the output generator dependent upon the source-pickup pair being enabled by positioning of the associated marking when the other source-pickup pair is disabled.

Another feature of this invention is a filter provided over the opening of the sensing head to reduce the effective ambient light while increasing the sensitivity of source-pickup pairs so as to require lower current levels and less power drain of such pulse initiators.

Other advantages and features of this invention will be apparent upon reference to the detailed description of the preferred embodiment illustrated in the drawings.

DESCRIPTION OF A PREFERRED EMBODIMENT

Figure 1:
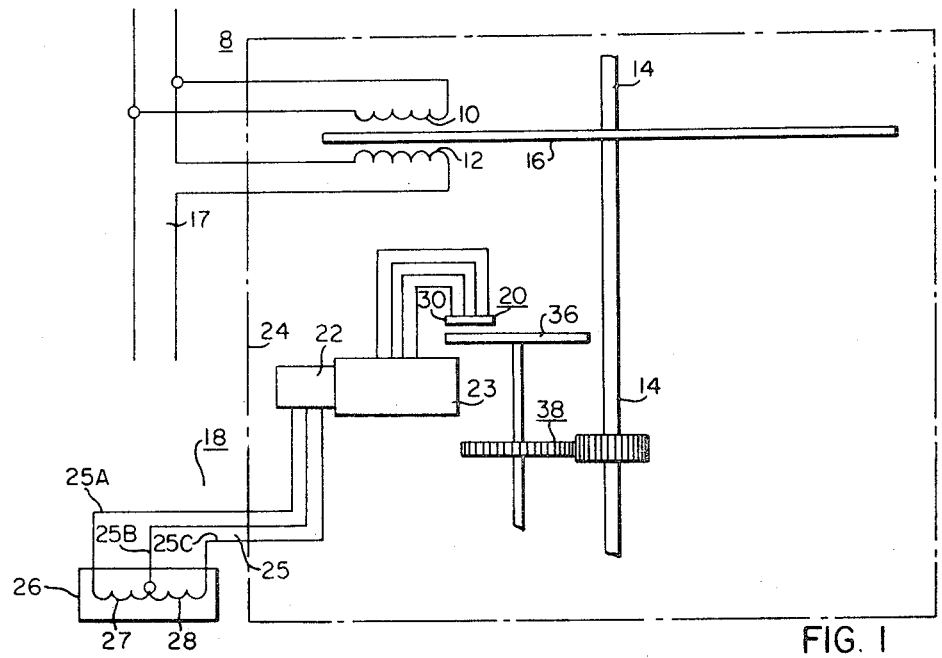
FIG. 1 is a schematic view of a remote meter reading system including a solid state radiometric pulse initiator made in accordance with this invention.

Referring now to the drawings wherein like numerals are used to designate similar or like elements in the several figures, and more particularly to FIG. 1, a meter 8 having an electroresponsive meter movement including metering coils such as a potential coil 10 and a current coil 12 and being of the type utilized in watthour meters, in one preferred embodiment for driving a shaft 14 and an associated disc 16. The meter 8 being of the integrating type registers the electrical energy quantity of a circuit 17 being measured by indicating the rotation of the shaft 14 at a remote location for counting or totalization by means of a remote meter reading system 18. A solid state radiometric pulse initiator 20 made in accordance with this invention, an output generator 22 and alternating current power supply 23 are mounted within the housing 24 of the meter 8 for translating the shaft rotation into pulse signals. The output generator 22 is connected to a three wire telemetering circuit 25 connecting the meter 8, with a three wire remote receiver 26 adapted for use in three wire telemetering circuits which are well known and are described in the aforementioned Electrical Meterman's Handbook publication and may include, for example, a stepper motor having two input signal windings 27 and 28.

Figure 3:
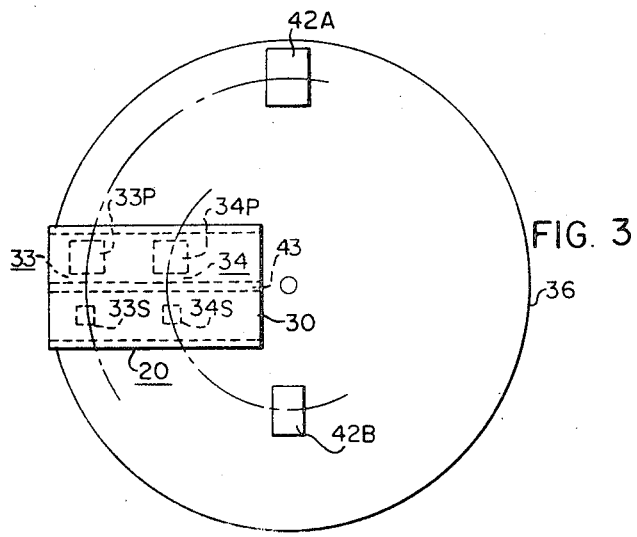
FIG. 3 is a top plan view of the pulse initiator and the associated pattern disc shown in FIG. 1.
Figure 4:
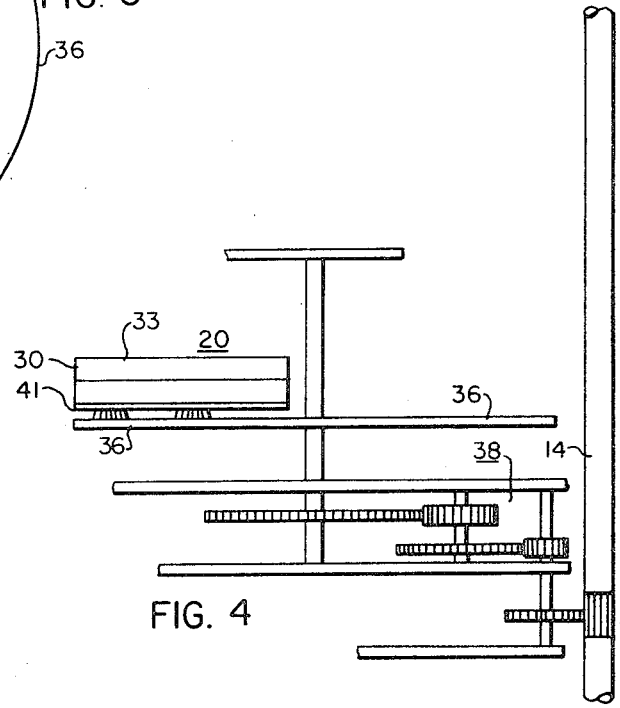
FIG. 4 is an enlarged side plan view illustrating the pulse initiator, the pattern disc and the associated gearing arrangement shown in FIG. 1.
Figure 5:
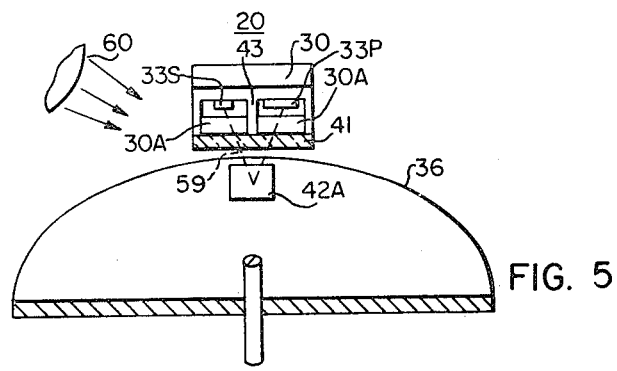
FIG. 5 is a schematic cross-sectional view in perspective of the pulse initiator sensing head having a filtering lens made in accordance with the present invention and a portion of the pattern disc in one operative position.

The pulse initiator 20, as shown in FIGS. 3 and 5 includes a sensing head 30 supporting first and second source-pickup pairs 33 and 34, mounted adjacent a pattern disc 36 driven by a suitable gearing system 38 from the meter shaft 14. The pulse initiator 20 further includes a pulse initiating circuit 40 described more fully in connection with the description of FIG. 6.

The first source-pickup pair 33 is mounted adjacent the second source-pickup pair 34 in a cavity 30A of a dual-in-line sensing head package as shown in FIG. 5. The cavity opening of the sensing head 30 is disposed substantially parallel to the pattern disc 36 and is spaced slightly from the top surface thereof. A radiation filter 41 described hereinbelow, covers the opening of the cavity 30A. First and second indicia markings 42A and 42B are defined by reflective areas on the disc 36 which are oriented radially at different radii so as to be rotatable in different circular paths. Disc rotation orients the reflective areas 42A and 42B to overlap the first and second source-pickup pairs 33 and 34, respectively, at different angular positions of the disc 36. It is understood that the number of reflective areas can be changed to develop a desired number of signals for each complete rotation of the disc 36.

Each of the source-pickup pairs 33 and 34 includes a solid state radiation emitter source 33S and 34S, respectively, and a solid state radiation responsive switch pickup 33P and 34P, respectively, which are adapted to be triggered to a conductive state in response to a predetermined radiation intensity when properly biased. In a preferred embodiment, each solid state switch pickup includes a phototransistor having a radiation responsive base-emitter circuit which when radiated at a predetermined triggering level, will render the collector-emitter circuit conductive. It is apparent to those skilled in the art that a phototransistor may be replaced by an equivalent device such as a photosemiconductor controlled rectifier (SCR). The radiation emitter of each source-pickup pair 33 and 34 includes a light emitting diode (LED) which characteristically emits radiation in the infrared frequency spectrum when conducting in the diode forward current direction.

In actual practice, mounting of the source-pickup pairs 33 and 34 within the sensing head 30 is such that they are in close side-by-side relationship, for example, in the order of one-fourth inch so as to provide a compact mounting arrangement. The pairs 33 and 34 are preferably shielded from each other within the sensing head package by partition 43, shown in FIGS. 3 and 5.

Figure 6:
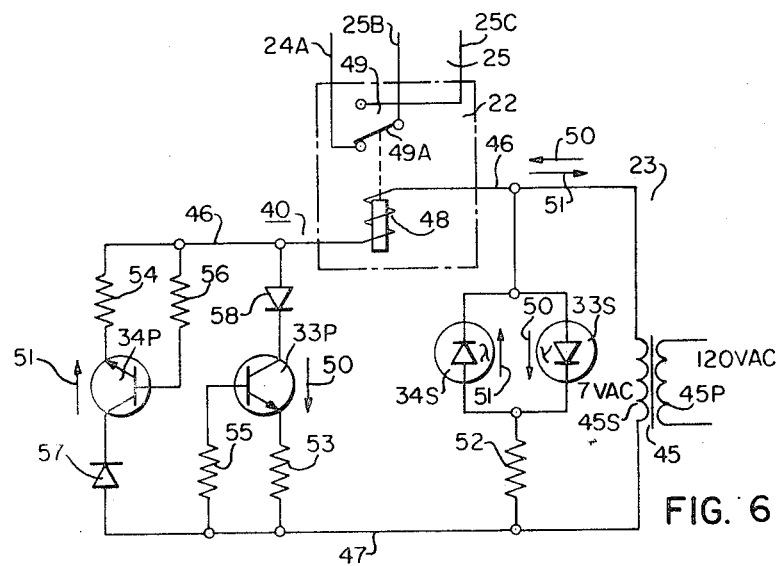
FIG. 6 is an electrical schematic diagram showing a pulse initiator circuit made in accordance with this invention and connected between an output pulse generator and an alternating current power source.

Referring now to FIG. 6, wherein the pulse initiating circuit 40 is illustrated schematically and is preferably mounted in the sensing head 30. The circuit 40 is supplied alternating current in the order of 7 to 8 volts by the power supply 23 including a step-down transformer 45. The primary 45P of the transformer 45 is normally connected to a 120 volt conventional power line source provided across a pair of conductors 54. The secondary 45S of the transformer 45 supplies energizing power to the pair of conductors 46 and 47 of the circuit 40.

The output generator 22, being of the magnetic latching type, includes a polarized coil 48 connected in series with the conductor 46 and forms the output of the circuit 40. The signal output of the output generator 22 is provided by a three contact device 49 defining a single pole, double throw switch connected to the telemetering circuit 25 which forms two circuits including conductors 25A, 25B and 25C. A switch arm 49A of the device 49 is magnetically actuated by the coil 48 such that when the conductor 46 is positive relative to the conductor 47, during a half-cycle of the output of the output of the power source 23, current flows through the coil 48 so as to latch the arm 49A in a first or lower position for conductively connecting the conductors 25A and 25B. The arm 49A is latched mechanically in this position after current flow terminates or with repeated current flow in the same direction as indicated by the current directional arrow 50. When the conductor 46 is poled negatively relative to the conductor 47, during an opposite half cycle of the power supply output, current flow through the coil 48 is reversed as indicated by the current directional arrow 51, so as to unlatch the arm 49A and position it such that the conductor 25C is connected to the conductor 25B. This operation is well known to those skilled in the art of output generators for pulse transmission over a three wire telemetering circuit. It is to be understood that the output generator 22 may include a bistable electronic circuit for developing pulse signals in the circuits 25A–25B and 25C–25B.

The solid state switch pickups 33P and 34P of the source-pickup pairs 33 and 34 comprise NPN phototransistors connected together in opposite current conducting relationship across the conductors 46 and 47. These switch pickups connect the coil 48 across the power source 23 when rendered conductive. Also, the radiation emitter sources 33S and 34S are connected together in opposing parallel relationship and across the conductors 46 and 47 through a resistor 52 as further illustrated in FIG. 6. The resistor 52 is of the current limiting type which establishes the level of current applied to each of the radiation emitter sources 33S and 34S. In one preferred embodiment, the solid state switch pickups 33P and 34P are formed by silicon NPN phototransistors responsive to radiation emitted by the emitter sources 33S and 34S and over a wavelength range of 0.4 to 1.1 microns. Resistors 53 and 54, respectively, are connected in the transistor emitter circuits which in turn are connected to the conductors 47 and 46, respectively. The transistor base circuits are connected by resistors 55 and 56 to the conductors 46 and 47, respectively, and the transistor collector circuits are connected in series with diodes 57 and 58 with the indicated polarity to the conductors 46 and 47, respectively.

When the conductor 46 is established negative relative to the conductor 47 by the power supply 23, the switch pickup 34P is forward biased for triggering from a nonconductive state to a conductive state when radiated with a predetermined intensity of radiation from the emitter source 34S. Current passes through the collector-emitter circuit to the coil 48 in a direction indicated by the arrow 51. Similarly, when the switch pickup 33P is radiated with a predetermined level of radiation from the emitter source 33S and the conductor 46 is made positive with respect to the conductor 47 to forward bias the transistor circuits of the switch pickup 33P, current flows through the collect-emitter circuit in the direction indicated by the arrow 50. Current flow is applied in an opposite direction to the coil 48 to actuate the three contact device 49 as described hereinabove.

The emitter sources 33S and 34S are connected so that when energized with a predetermined current level in the forward diode conducting direction, sufficient radiation thereof will be reflected when the associated reflective areas 42A or 42B is positioned directly beneath the portion of the sensing head 30 including the associated source-pickup pairs 33 or 34, respectively.

In one embodiment the LED of each source 33S and 34S includes an infrared emitting diode made of P-type and N-type gallium arsenide material having a narrow band of radiation peaking at 9,000A (non-visible) when forward biased. Accordingly, when the half cycle of the power supply output is such that the conductor 46 is poled positive with respect to the conductor 47, the emitter source 33S conducts current and the switch pickup 33P is poled for forward biasing while both the switch pickup 34P and emitter source 34S are reverse biased and disabled for current flow. Correspondingly, if the conductor 46 is made negative with respect to the conductor 47 during the opposite half cycle the source pickup pair 34 is enabled while the source-pickup pair 33 is disabled and it is impossible to concurrently trigger the solid state switch pickup 33P.

Accordingly, the infrared emitter sources 33S and 34S conduct alternately with each phase reversal of the alternating current output of the power supply 23. It is an important characteristic of the light emitting diodes utilized for emitter sources 33S and 34S that the radiation therefrom is emitted in a narrow radiating cone so that the radiation incident upon the reflective areas 42A and 42B has a "spotlight" effect preventing dispersion of the radiation. The radiation is reflected onto the photosensitive transistors forming the solid state switch pickups 33P and 34P for triggering since they have a primary response typically between 3,000A to 11,000A peaking at about 8,000A. Due to the inherent false pulse triggering prevention circuit arrangement as well as the optical shielding of the source-pickup pairs 33 and 34, cross-radiation between emitter sources of switch pickups of different source-pickup pairs is prevented to prevent false triggering.

As noted hereinabove and shown in FIG. 5, the opening to the cavity 30A of the sensing head 30 package includes a filter 41. The use of the filter 41 uniquely increases the triggering sensitivity of the source-pickup pairs 33 and 34 when the pulse initiator is utilized in outdoor mounting arrangements subject to high ambient sunlighted conditions. The filter 41 is a coating of material formed of a vaporized silicon compound having a predetermined filtering characteristic. The radiation filtering characteristic of this compound has been found to substantially block radiation having a wavelength less than approximately 8,500A and to pass substantially all radiation wavelengths above approximately 8,500A. The spectral output of the diode emitter sources 33S and 34S is within a relatively narrow bandwidth centered about 9,000A as noted above and the radiation response of the phototransistor switch pickups 33P and 34P is also within a bandwidth from 8,500A and slightly above so that most of the infrared source radiation passes out through the filter 41, strikes the areas 42A and 42B and passes back through the filter 41 as shown by arrows 59 in FIG. 5. It is known that the radiation intensity included in sunlight radiations, indicated by source 60, is not linear and the intensity thereof decreases through higher frequencies having a peak value below 8,500A. It is believed this characteristic is utilized in this invention since only a small amount of the radiation of the emitter sources 33S and 34S is filtered by the filter 41 while a substantially larger amount of the normal ambient radiation provided by sunlight is filtered within radiation response spectrum of the switch pickups 33P and 34P.

Figure 2:
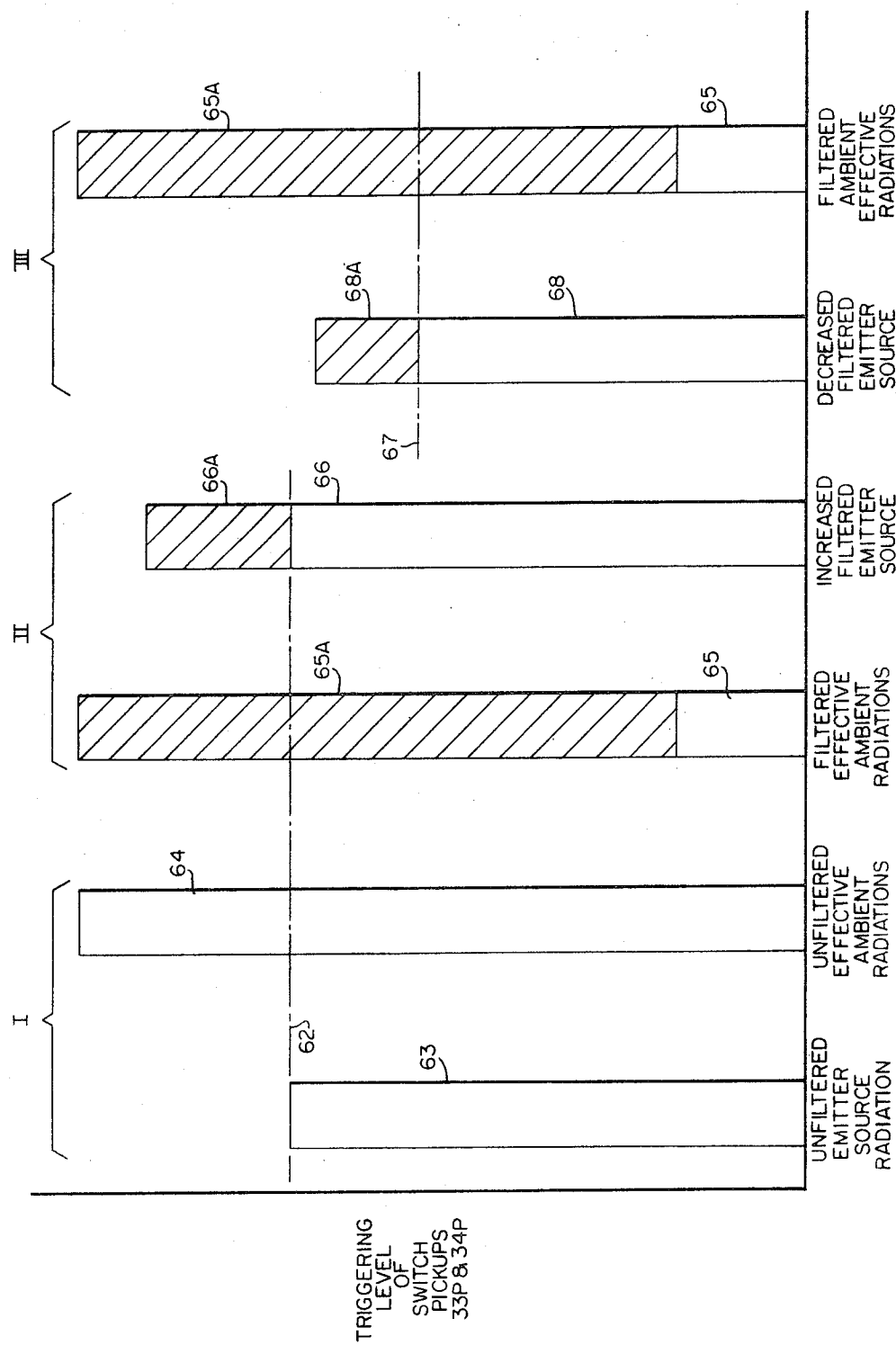
FIG. 2 is a graph illustrating filtered and unfiltered ambient and emitter source radiations relative to triggering levels of switch pickups.

Reference is made to the graphs of FIG. 2 to describe my manner of increasing sensitivity of the source-pickup pairs in relation to the difference in radiation intensities of the emitter sources and the normal ambient radiation of the source 60 which is principally provided by sunlight. In one initial exemplary condition without the filter 41, indicated by Roman numeral I, the triggering level of the solid state switch pickups 33P and 34P was provided by adjusting the values of the transistor biasing resistors such that when an optimum current was provided through the emitter sources in the order of fifty milliamps, as determined by the value of the resistor 54, a triggering level indicated by line 62 was established. The diode current in either of the sources 33S or 34S produced a radiation intensity indicated by the bar 63 extending to the triggering level 62 in the absence of any ambient light. In this condition the source-pickup pairs 33 and 34 were operated in a normally lighted ambient including the sunlight radiations of the source 60 which developed the ambient radiation intensity represented by the bar 64. This intensity was greater than the triggering level 62 rendering the sources 33S and 34S ineffective to selectively operate the pulse initiator circuit. Effective operation was possible by increasing the diode current of the emitter sources 33S and 34S and decreasing the sensitivity of the switch pickups, however, this was beyond practical limits for extended reliable service life.

In a second exemplary condition, indicated by Roman numeral II, the filter 41 was provided over the cavity 30A of the sensing head package so as to reduce the normal ambient radiation intensity by an amount indicated by the shaded portion 65A of the bar. Due to the concurrent filtering of the emitter sources radiations, a maximum current level of 65 milliamps was required to produce the radiation intensity to trigger the switch pickups at the sensitivity triggering level 62, which is indicated by the bar 66, being the same as in the original example condition. The shaded portion 66A of the bar 66 indicates emitter source radiation blocked from the switch pickups by the filter 41 and the remaining solid portion of the bar 66 indicates source radiation transmitted to the pickups.

It was later observed that extraneous ambient light was filtered substantially more than the emitter source radiations and it was found that the sensitivity of the source-pickup pairs could be reduced in a third exemplary condition indicated by Roman number III. The sensitivity of the response of the source-pickup pairs 33 and 34 being directly related to the difference in the background or ambient radiation and the radiation of the emitter sources 33S and 34S, the triggering level of the switch pickups 33P and 34P was decreased to the level indicated by line 67, indicated by being lower in the graph of FIG. 2 than the triggering level line 62. This increase of sensitivity also permitted the current of the emitter sources 33S and 34S to be reduced, for example, to 40 milliamps maximum current to provide radiation intensities indicated by bar 68 extending to the line 67 to trigger the switch pickups 33P and 34P. The shaded bar portion 68A above bar 66 indicates the portion of the emitter source intensity blocked by the filter 41. Accordingly, the use of the filter 41 as described hereinbefore increases the sensitivity and response of the pulse initiator circuit and concurrently permits operation of the emitter sources 33S and 34S at lower current levels reducing the amount of power required for the pulse initiating circuit and increasing the service life of the emitter sources. Also with the increased sensitivity of the switch pickups 33P and 34P, greater accuracy is provided in response to the positioning of the reflective areas 42A and 42B adjacently below the sensing head 30.

In addition to the reduction of cross-triggering between the source-pickup pairs 33 and 34 as described hereinabove, there is also reduced tendency of any false triggering due to the normal ambient radiations or extraneous light sources since the filtering lens 41 substantially reduces radiation having frequencies effective to cause triggering of the switch pickups 33S and 34S and makes them substantially exclusively responsive to the emitter source radiations. Accordingly, the pulse initiator 20 is referred to as a radiometric type as distinguished from the more general light responsive or photometric pulse initiators used herein before my invention in remote meter reading systems.

While a preferred embodiment of the invention has been described herein, it is contemplated that modifications and alterations of my invention may be made without departing from the spirit of this invention.

I claim:

1. In a system for transmitting information from a meter having a meter movement including a rotating shaft, the combination comprising:
   a pattern disc drivenly connected to said shaft, said pattern disc including first and second indicia markings rotatable through separate circular paths;
   a pulse initiator including first and second radiation source-pickup pairs, each of said first and second pairs including a solid state radiation emitter source and radiation responsive pickup located so that each pair is periodically aligned with a separate one of said first and second markings for directing radiations of a source to an associated pickup when said pattern disc is rotated;
   an alternating current power source;
   first circuit means connecting said radiation emitter sources of each pair in separate circuit paths across said power source such that current flows alternately in opposite directions through each path for alternately energizing said sources; and
   second circuit means connecting said pickups of each pair in separate circuit paths across said power source such that current is applied alternately in opposite directions to each of the last-named circuit paths when current is applied to an associated emitter source in the same pair for selectively enabling one source-pickup pair when the other is disabled.

2. The system of claim 1 wherein each of said radiation source-pickup pairs includes a unidirectionally conducting solid state emitter source connected in opposing parallel relationship to the other source.

3. The system of claim 2 wherein each radiation responsive pickup includes a solid state switching device operative between non-conducting and conducting states and is connected with said power supply so as to be poled in a forward conducting direction concurrently with energization of the associated solid state emitter source.

4. The system of claim 3 wherein a three wire output generator is connected between said second circuit means and said power source for generating two different signals in response to the conducting state of each switching device, respectively.

5. The system of claim 3 wherein a common sensing head package exposed to a high level of ambient light radiations supports said solid state emitter source and said solid state switching device of each source-pickup pair, said package including a cavity receiving each pair with the cavity opening facing said disc; and a filter means covering the cavity opening, said filter means having a predetermined frequency range for substantially limiting all effective radiations between a source and a pickup except for the source emitted radiations and the responsive radiations of the pickup.

6. The system as claimed in claim 5 wherein the ambient radiation condition predominantly includes radiations of the sun and said predetermined frequency range is principally within the infrared frequency spectrum; and further wherein said indicia markings are defined by radiation reflective areas of said disc.

7. The system as claimed in claim 6 wherein each source-pickup pair includes an infrared light emitting diode and a silicon phototransistor having a radiation frequency response over a slightly greater frequency range than the frequency range of radiations of each light emitting diode and wherein a radiation limiting characteristic of said filter means includes a frequency range partially within said radiation frequency response of each phototransistor and a radiation transmitting characteristic including substantially all of the radiation frequency range of said diode.

* * * * *